July 8, 1941.  F. H. POEPPELMEIER  2,248,781

TYPE COMPOSING MACHINE

Filed April 21, 1938  7 Sheets-Sheet 1

INVENTOR.
FRANK H. POEPPELMEIER.
BY
Allen & Allen
ATTORNEYS.

July 8, 1941.   F. H. POEPPELMEIER   2,248,781
TYPE COMPOSING MACHINE
Filed April 21, 1938   7 Sheets-Sheet 7

INVENTOR.
FRANK H. POEPPELMEIER.
BY Allen & Allen
ATTORNEYS.

Patented July 8, 1941

2,248,781

UNITED STATES PATENT OFFICE 2,248,781

TYPE COMPOSING MACHINE

Frank H. Poeppelmeier, Dayton, Ohio, assignor to Dayton Type, Incorporated, a corporation of Delaware Application April 21, 1938, Serial No. 203,367

27 Claims. (Cl. 276—18)

This invention relates to machines for setting type and more particularly to the selecting of type and discharging of same to a chase or some other retaining device.

This application is a continuation in part of those aspects of my invention, as set forth in my co-pending application Serial No. 136,244, filed April 12, 1937, which relate to delivery of type to a belt and collection therefrom and embodies also certain improvements thereover.

The general theory of operation of the machine is to control by means of a typewriter a series of ejector fingers which force out individual pieces of type onto a moving belt. On this moving belt are converging guides which ultimately bring the selected type into a line in the order of their selection by means of the typewriter. The type are then discharged from this line and are then delivered, the preferred delivery being to a rotary chase into which the type are pushed one at a time, although the type could be collected in a holder and later inserted into a chase from the holder, or justifier.

Provision is made in the present machine for a number of factors which enter in to the success of such a device. In the first place it is essential that the type come into line in the order that they are discharged. This requires a most careful arrangement of the guides which converge over the belt and by my experience I have found that this requires a co-ordination of the angular relationship of the type holders located over the belt, and the angular guides which later engage the type. It also requires special arrangements for type which do not contact the converging guides until they have practically reached the point of bringing them into line.

In order to gain speed and since the type must be arranged in lines for printing, there is a delay between the point when one line of type has been selected and ejected and the next line started. To that end I have provided means whereby the flow of type can be stopped when the operator has finished writing one line of type as he can see from examination of the collecting device, so that the type then traveling on the belt can collect. This permits the operator to go ahead with the type deposit on the belt, and the mechanism in question is hooked up with the line changer on the collection device, so that upon changing lines, the held-up type will be released.

One great difficulty in operation of such a machine, particularly where the operation is at relatively high speed, is that the type must be guarded against being twisted around so that their faces change direction. Of course, all type must face upwardly when finally located in line and hence must all be faced alike when collected.

To the end of making provision against such incorrect facing the relative angles of the type delivery, the present invention provides for an initial guiding means for the individual type which act upon the type as they are transferred to the belt, and this guiding means and other instrumentalities are combined to give a definite orientation to the type as they move along on the belt, so that they will not be jolted into an improper relationship with the belt, and hence with each other when brought into line. The type themselves are particularly shaped to operate satisfactorily in connection with the converging guides, and the type ejectors are shaped where necessary to avoid twisting the type about in their initial ejection from the magazine.

In addition to the above provisions my invention embodies other improvements in the various parts of the mechanism, all directed to facilitating rapid setting of type with a minimizing of the various possible difficulties attendant upon such an operation. These will be noted as the description proceeds of the exemplary mechanism illustrative of my several improvements which has been shown in the drawings appended hereto.

Figures 1, 2:
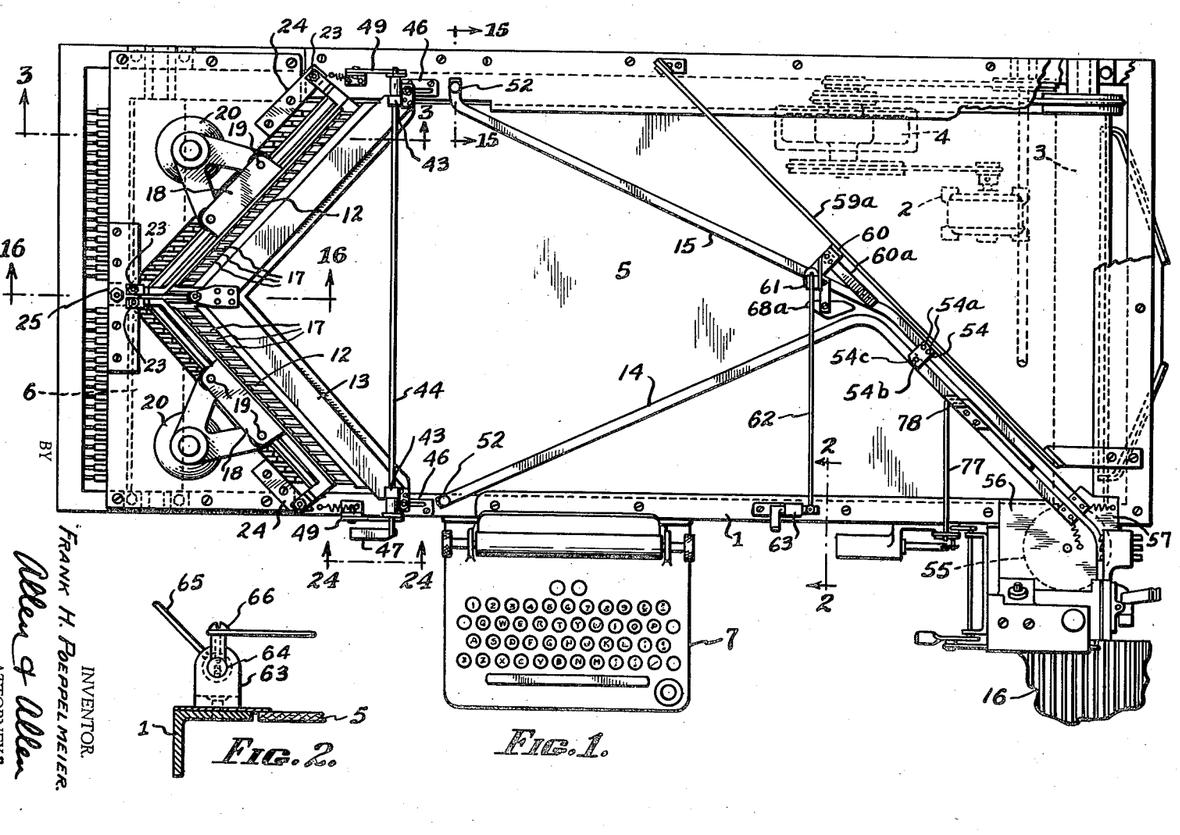
Fig. 1 is a plan view of the machine with parts broken away.
Fig. 2 is a section taken along line 2—2 of Fig 1.

The general organization of the machine (Fig. 1) includes a main frame generally indicated at 1, and motor drive indicated at 2, and a belt drive roll indicated at 3, which is driven from the motor by a transmission 4. The belt 5 is of a hard composition and is mounted to cover practically the entire bed of the machine, supported by the roller 6 at the left hand end of the machine. There is a typewriter 7 which is arranged to close electrical circuits to solenoid operators 8 (Fig. 3) which operate rods 9. The rods, one for each character on the typewriter, are connected to spring pressed rockers 10 which in turn serve to advance and retract the ejector fingers 11 that dislodge the type one at a time.

The type are mounted, in the example shown, in two frame 12, 12 (Fig. 8), arranged in a V-shaped position with reference to each other. The type passes onto the belt first traversing the channel of a comb 13 (Fig. 9) which orients the type on the belt. A pair of rails 14, and 15 converging from the full width of the belt to a channel about the width of a single type results in the type being delivered to the discharge mechanism, from whence the type are forced one at a time into a chase 16.

*The type mounting and ejection*

Figures 8, 9, 10, 11, 12:
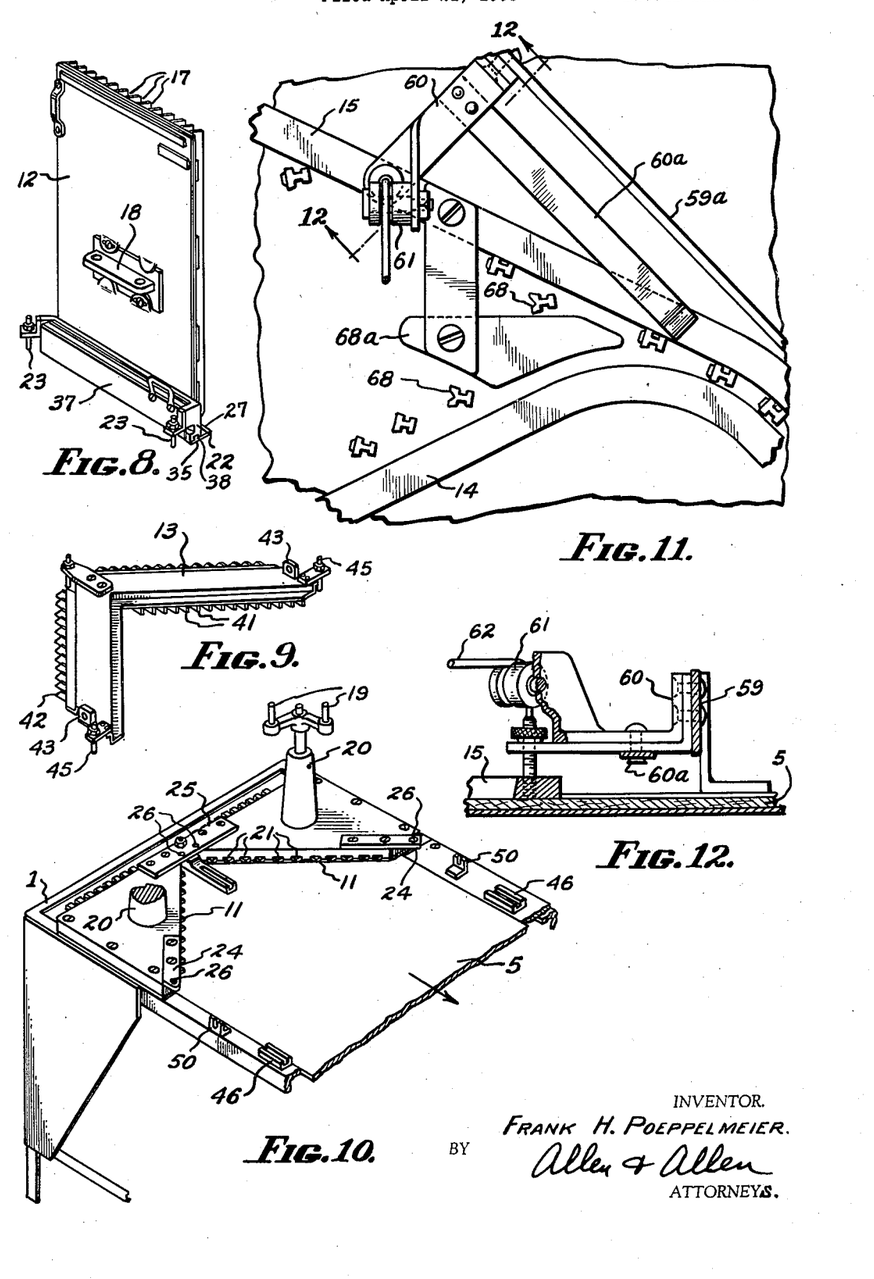
Fig. 8 is a perspective of one of the type magazines.
Fig. 9 is a perspective of the comb.
Fig. 10 is a fragmentary perspective of the left end of the machine, but having the type magazines and the comb removed.
Fig. 11 is an enlarged fragmentary plan view of certain parts of my machine.
Fig. 12 is a section along line 12—12 of Fig. 11.

The frames 12, 12 are provided with channels 17 on one face into which are placed the type, selected in a definite way to correspond with the typewriter actuated ejector devices. These frames have a bracket 18 on their rear faces which is perforated so as to seat and be located on pin forks 19 mounted in suitable bosses on the casting 20 at the type end of the machine. This casting is provided with channels 21 in each of which lies and is guided one of the ejector fingers or pushers 11.

The frames have a stiff bottom piece 22, which carries two studs 23, and the casting has plates 24, 24 and 25, in which are located holes 26 to receive these pins. By the several pin and hole engagement devices the type holding frames are very exactly located in the machine, the arrangement being such that an angle of about 94½ degrees is maintained between the two frames.

Figures 3, 4, 5, 5A, 6, 7:
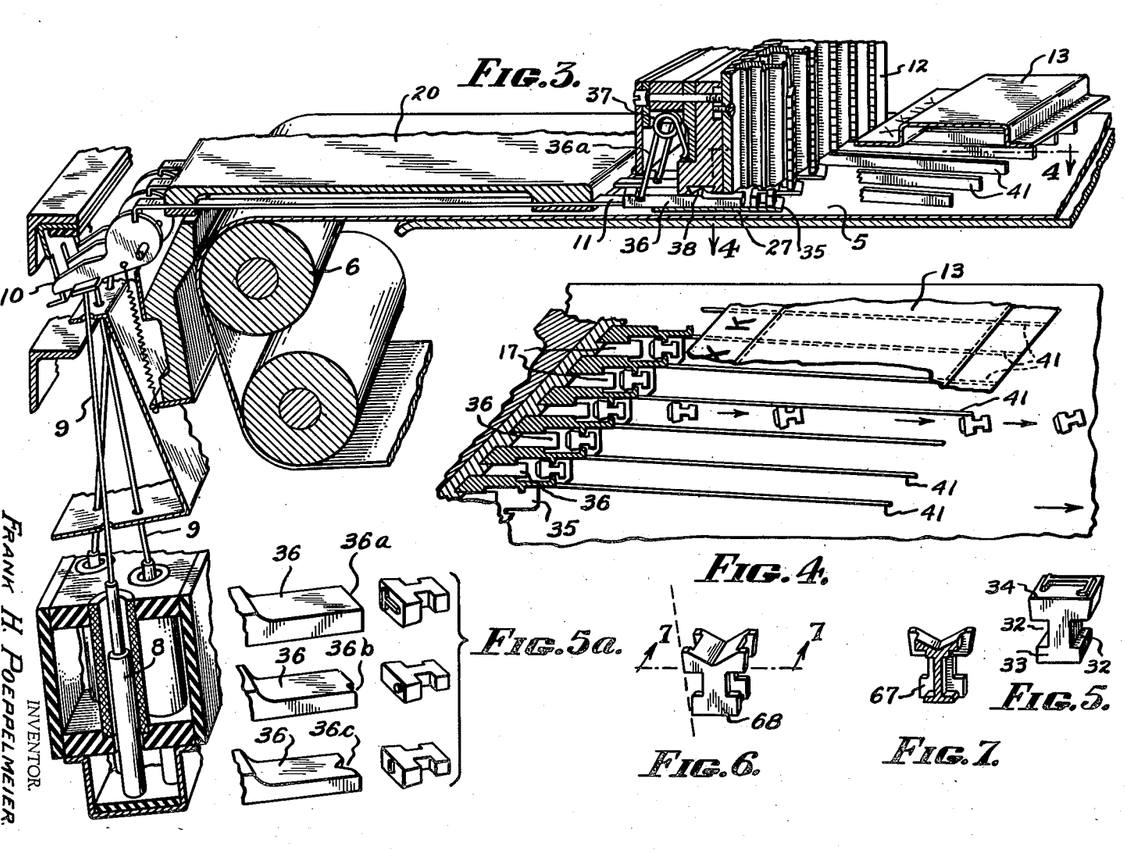
Fig. 3 is a fragmentary perspective taken along the line 3—3 of Fig. 1.
Fig. 4 is a horizontal sectional view, with parts broken away, being taken along line 4—4 of Fig. 3.
Fig. 5 is a perspective of a piece of type adapted to be used in my machine.
Fig. 5a illustrates how the ejector members of the type magazines may be modified to suit various characters of type.
Fig. 6 is a perspective of a quad, which has certain advantages in conjunction with typesetting and composition, said quad being somewhat compressible so as to permit justification of the lines.
Fig. 7 is a perspective taken along line 7—7 of Fig. 6.
Figures 17, 18, 19, 20:
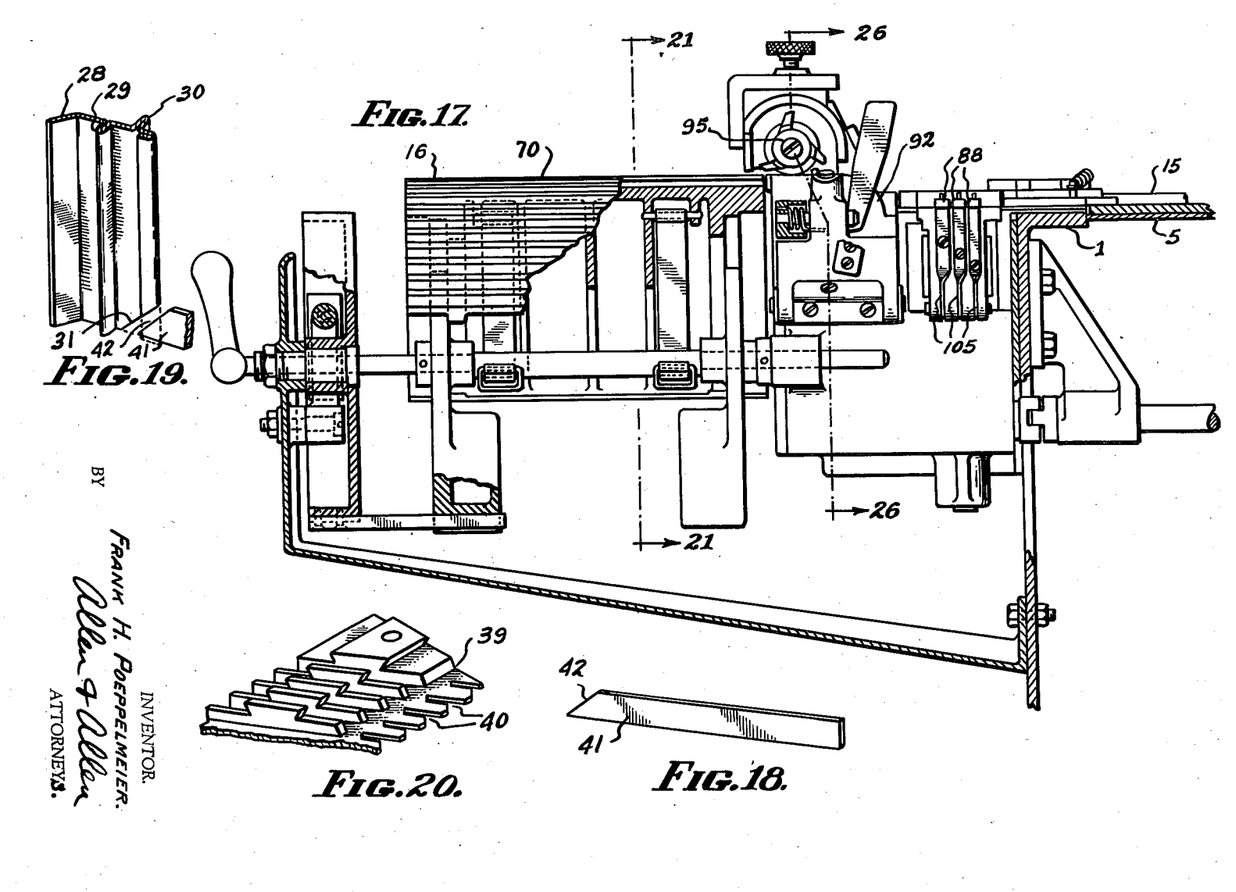
Fig. 17 is a fragmentary side elevation taken at the right end of the machine, showing the ejector and the means for receiving the type discharged therefrom. The figure has parts broken away and certain parts in section to clarify certain details of construction.
Fig. 18 is a perspective showing a blade or tooth removed from the comb of Fig. 9.
Fig. 19 is a perspective illustrating a preferred manner of forming the vertical guide rails of the type magazines.
Fig. 20 is a fragmentary perspective of the bottom plate of a type magazine.

At the under side of each frame is a ledge 27, spaced from the end of the channel walls. By reference to Fig. 19 it will be noted that a preferred way to make the frame channels is to bend up a strip of metal with a face 28 to be welded to the frame plate, a rib 29 which engages in the lateral grooves of the type, another rib 30 which engages in a groove of an adjacent type (Fig. 4). The outer rolled edge of each strip is cut away at 31 to match the angle end of one of the tines of the guiding comb, as will be described. Fig. 4 shows the channels as cast parts, whereas Fig. 19 shows them as strip metal formed into a similar shape.

The type themselves are of the short variety, rather than the type of high variety, and have channels 32, feet 33 and heads 34, the type faces being on the heads. It will be noted (Figs. 5 to 7) that the heads of the type are somewhat tapered on the sides which will not contact when the type are arranged in a line. This taper serves a purpose to be noted. As shown in Fig. 4, when the type are dislodged they travel on the belt foot foremost with the tapered faces of the heads on the sides.

The lowermost piece of type in a channel rests on a support plate 35, one for each frame, and the frames carry the plungers which actually contact the type, one for each ejector finger. These plungers 36 are carried between the base piece of the frame in each instance and the type support plate and each plunger has a spring 36a, mounted in a little housing 37 that extends across the lower back portion of each frame.

It will be evident from the above that when the frames are in place, and a typewriter key is operated, the plunger for the particular letter struck on the typewriter will be actuated to dislodge the lowermost type of that letter and shove it off of the support plate.

As illustrated in Fig. 5a, it is found desirable to shape the ends of the plungers in order to avoid giving a twist to the type that is dislodged, or an extra push which will result in its getting out of position as it is shoved off of the support plate. Thus for a letter such as T, the plunger face will be plane as at 36a. For a period, which is a dot at one side of the face of another piece of type, instead of the plunger being plane-faced it is ground off slightly as at 36b, which results in a full contact across the type by the plunger. Where a dash is the face of the type, then a groove is milled in the middle of the plunger face as at 36c, to give a full engagement across the type face in this instance. On this principle the plungers are provided to adapt themselves to giving a straightforward pushing to each piece of type.

The support plate for the type may be mounted preferably as illustrated in Figs. 3 and 20. To this end the base piece of the frame is provided with a dovetail groove 38, and the support plate provided with a series of ledges 39 spaced with the channel walls, each of which ledges have a dovetail to engage in this groove. As shown, also it is desirable that the forward portion of the support plate be slotted as at 40 between each channel to permit of the introduction of the tines of the guide comb, as will be described.

Referring next to the guide comb (Fig. 9), I provide a frame plate 13 which is properly angled to adapt itself to the arrangement of the type frames. On the underside of this plate are a series of ribs 41 serving as tines of the comb, which are spaced to correspond with the type channels, and cut off at a slant, as indicated at 42, to fit directly against the walls of each channel. The arrangement is such that the guideways between the tines of the comb are slightly wider than the head of a piece of type, and the tines fit in the slots in the advanced edge of the type support plates.

When a piece of type is pushed from the support plate, it is deposited on the belt which is moving just underneath it, which results in the type being moved along by means of the belt between the guideways of the comb tines.

Now the tines of the comb are so arranged that they act upon the type in a definite way, as illustrated in Fig. 4. Thus the tines are angled so that on each side of the center of the machine, the type strikes against the tine on the side away from the center, and due to the general taper outlines of the type due to the fact that the heads are larger than the feet, the type will take a position which is somewhat out of the exact longitudinal feeding direction of the belt. Then as each type leaves the comb, and since the head is the last portion to leave the comb, the belt tends to swing the type slightly and thus angles it a bit more away from the center line of the machine. Thus each piece of type is not only guided to a very exact position by the comb, overcoming any irregularity in discharge of the type onto the belt, but the exact orientation desired is given to each piece of type.

My preferred arrangement is such that a line drawn from the margin of the type head to the margin of the type foot of each type, as it leaves the comb, is at an angle of about two degrees away from the center line of the machine in the direction of feed of the belt. This orients the type perfectly for engagement with the converging guides, when arranged as they are arranged in this machine, and as will be described.

For mounting the comb in such a way that it can be moved away for inspection of the type channels, I prefer (Figs. 1, 24 and 25) to provide ears 43, which have holes accommodating a cross rod 44. The comb frame is also provided with pins 45 at each end which engage in grooved fittings 46, one on each side of the machine. Thus by moving the rod, the comb will be caused to slide with the pins in the grooves.

Figures 21, 22, 23, 24, 25:
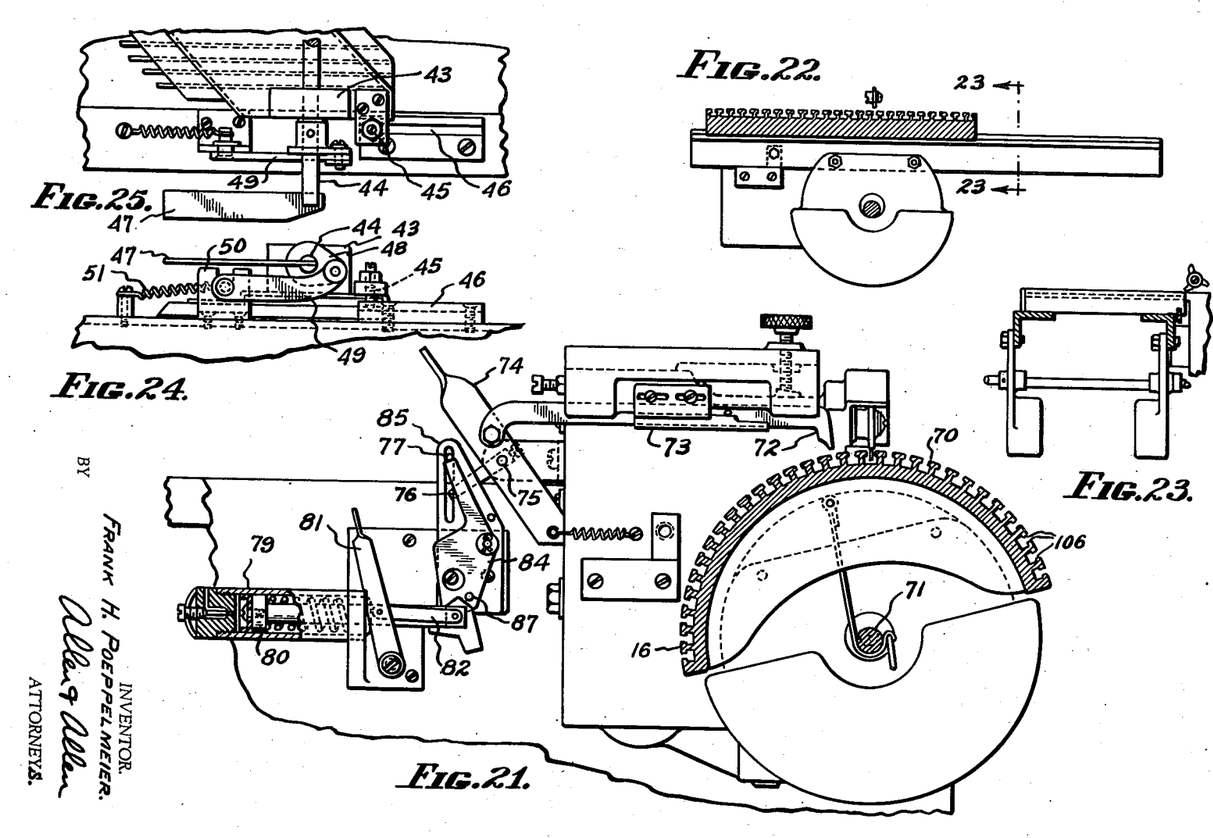
Fig. 21 is a section along line 21—12 of Fig. 17. This figure shows a segmental chase mounted for receiving the type.
Fig. 22 is a section taken along the same plane as Fig. 21, but being reduced in scale and showing a flat chase mounted to receive the type.
Fig. 23 is a section along line 23—23 of Fig. 22.
Fig. 24 is an enlarged side elevation taken at the line 24—24 of Fig. 1.
Fig. 25 is a fragmentary plan view of the parts shown in Fig. 24.
Figure 26:
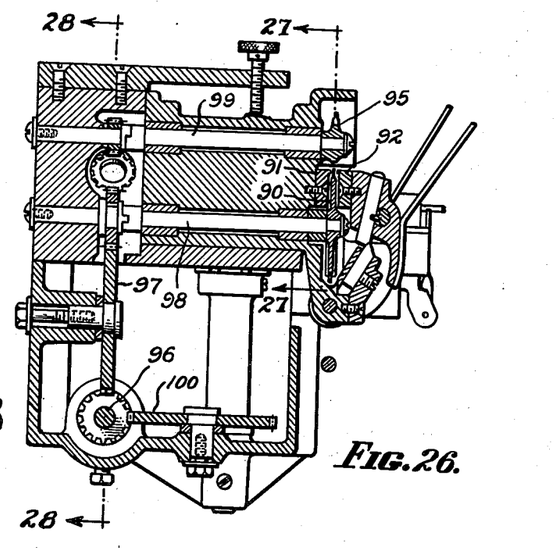
Fig. 26 is a section taken along the line 26—26 of Fig. 17.

As a mode of moving the rod, it is provided with a finger 47 at one end, and at each side of the machine the rod is equipped with a tight link 48 which is pivoted to a swing arm 49. The swing arms are arranged with pins on the ends thereof which are seated in forks 50, in which position the arms are held by means of springs 51. The result of lifting the finger 47 in Fig. 24, is to depress the swing arms 49, with the tight links pivoting on the arms, and thus sliding the comb along with its pins in the slots of the supporting pieces.

The type collecting and aligning

The guides for convergingly forcing the type into the final line ready for discharge are fixed, and could not be movable, with any effectiveness, because the machine must have an exact operation otherwise with rapid writing the letters will not be discharged in the order of the deposit of the type on the belt. It is further desirable to have a rather extensive belt, because it is then possible, if an error is made to correct the error before the type are discharged into the chase, and time is given for this purpose by having an extensive belt.

Figures 13, 14, 15, 16:
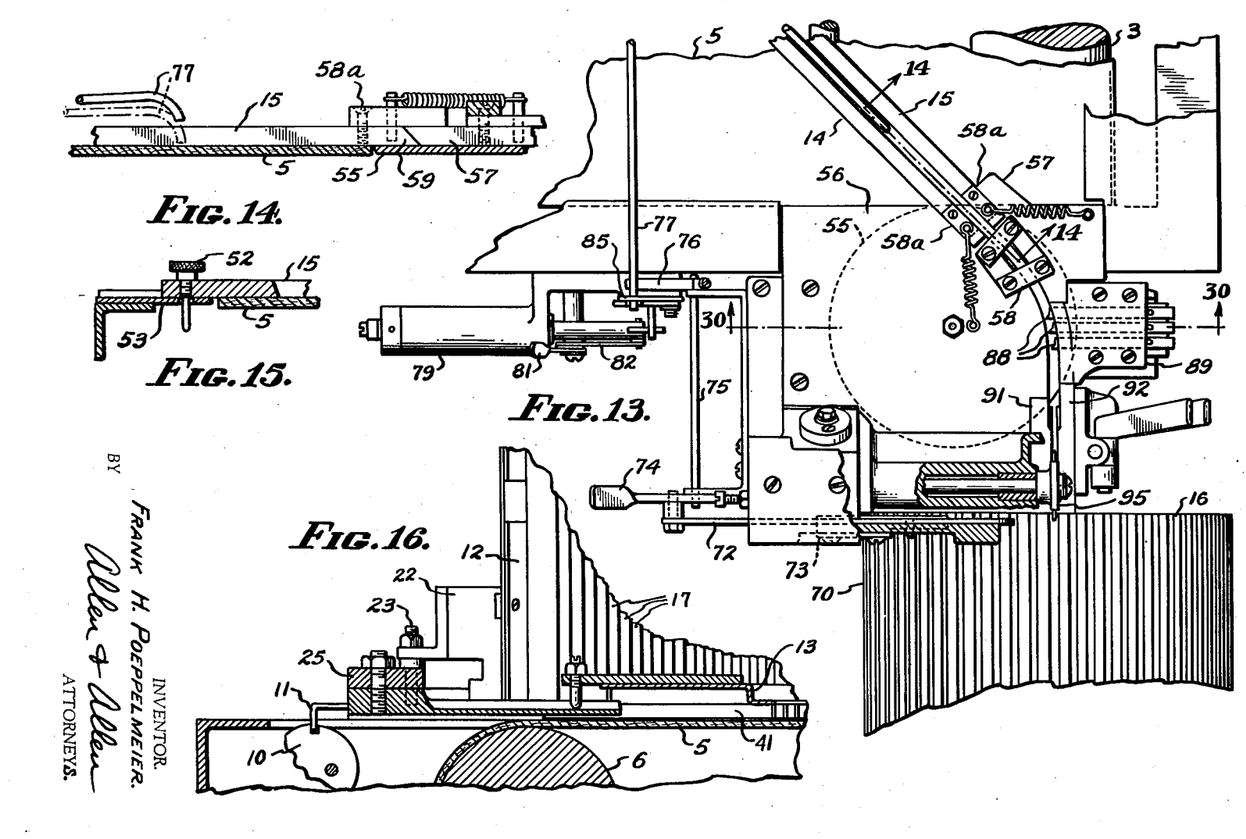
Fig. 13 is an enlarged fragmentary plan view, with parts broken away and certain parts in section, showing details of construction at the discharge or ejector end of the machine.
Fig. 14 is a section along line 14—14 of Fig. 13.
Fig. 15 is a section along line 15—15 of Fig. 1.
Fig. 16 is a section along line 16—16 of Fig. 1.

The guide rails are preferably stainless steel strips 14 and 15 having pins 52 on the ends toward the type end of the machine, which pins engage in holes in suitable brackets 53 on the machine frame. These ends of the guide rails can thus be lifted out as desired. The rails are also chamfered along the edges presented to the type, as indicated in Fig. 15, so that the type only contacts a restricted portion of the rails.

The rails converge to a point where they are spaced apart about the width of a piece of type, and bend at this point, where it is desired to deliver the type to the side of the machine where the typist is seated. The two rails are held in fixed spaced relation by a plate 54, and their ends are mounted as shown in Figs. 13 and 14. The plate 54 is fixed to rail 15 by screws 54a and has a hole 54b which is slidably engaged by a pin or stud 54c fixed in the rail 14.

The delivery wheel 55, which takes the type from the belt for discharge purposes and lies closely over the surface of the belt is protected by a cover plate 56, and an additional plate 57, leaving a slot between them for the passage of the type, said two plates being strapped together at 58. The ends of both guide rails are beveled off as indicated at 59. The meeting edge of the plate 56 engages and holds down the rail 14, and the edge of the plate 57 engages and holds down the rail 15, the arrangement being such that the two meeting edges of the two plates take over the type guiding operation from the rails. To hold the guide rails in place they are equipped at the ends with blocks 58a which have upwardly projecting pins that are engaged by springs.

With this arrangement, the type guided by the converging rails is delivered to the guides over the discharge wheel by means of the guides in a single line. It is obviously desirable, if a mistake is made by the operator in striking the typewriter keys, or if something goes wrong with the type on the belt, that the belt be cleared without permitting the type to go onto the discharge mechanism. This is accomplished in the present machine by lifting the one guide rail 15, so that the belt is not interfered with and can feed the type off the end of the machine.

In order to provide for this the selected arrangement is as follows: (Figs. 1, 11 and 12) A brace rod 59a is arranged at an angle matching generally the guide rail 15 but beyond it, the rod being secured to the machine frame. A bracket on the rod as at 60 extends across over the rail 15 about where it converges with the rail 14, and carries a leaf spring 60a which tends to hold down the rail 15 by bearing upon it. On the bracket also, is a pulley 61, over which is passed a cable 62, the end of which is secured to the rail 15, so that by pulling on the cable the rail will be raised, sufficiently to permit type to pass beneath it. In order to pull the chain a bracket 63 is provided at the side of the machine near the typewriter, which supports a rock shaft 64, on which is a handle 65 and a pin 66. The cable (or it may be a chain) is connected to the pin, so that by rocking the handle the pin will be swung, and the cable pulled. The leaf spring 60a returns the guide rail 15 to its normal position of close proximity to the surface of the belt.

I have shown in Fig. 6 certain justifying quads or spacer type, having recessed bodies shown best in section at 67 in Fig. 7, and regular type spaced and sized faces 68 as shown best in Fig. 6. These quads can be compressed, and the spaces between words thus altered and a line of type thus justified.

Now these quads are light in weight, and hence are difficult to use in the machine because of great ease of becoming shifted out of position, due to sharp edges etc. as well as light weight. Hence they are delivered along the central line of the machine and so placed in the type frames, that they do not contact with guide rails, in their travel, until the guide rails have been converged together.

In order to provide additional safeguard against these quads becoming shifted around, I provide a plow shaped plate 68a, mounted on the rail 15, and lying over the belt just at the point where the rail 15 converges to alignment with the rail 14. Thus the quads as they come to this point which follows from the point of delivery thereof to the belt, will be guided to position not only by the guide rails but by the sides of the plow shaped pieces. It will be desirable to feed the quads selectively from both of the two middle type channels in the machine, since quads are used up more rapidly than letters and hence the plow shaped formation. It has been found that difficulty with the quads is avoided by this device which provides lateral confinement on both sides to the quads as soon as they strike the rails.

The particular angle at which the guide rails are placed is very important indeed, because the rails function in the timing of the travel of the type. Thus if a type is discharged near the center line of the machine, and immediately thereafter another type is discharged near one side of the belt, the first type discharged must get first to the converged channel formed by the guide rails. The result of the angle at which the type frames are placed is that the type nearest the side of the belt has the shortest linear distance measured along the belt, to the said converging point. However, this piece of type must strike the one guide rail and be fed along by the belt and slid inwardly by its contact with the rail, and the time of this operation must be exact with relation to the time that it takes a quad for example, to travel the full length of the belt near the center line of the machine.

Of course, if the typewriter were operated slowly this exactitude would not be necessary, but with high speed typewriter operation and rapid belt movement, it is found that only certain angles will work at all, and these within very close limits. A belt which is hard surfaced and smooth is presupposed in the problem, and guide rails which are arranged to make a minimum of contact with the type. With a rough belt, or moving side guides, or wide contact surface with the type, rapid and accurate operation is not possible in any arrangement.

The angles which I have found to operate to best advantage are a relative angle of 94½ degrees in the type frames, and a relative angle of 50 degrees between the guide rails, both angles being equally divided along the center line of travel of the belt. With these angles a very rapid typewritting operation can be followed, and the type will be delivered in the order in which they are discharged on the belt.

It will be recalled that the type are set with their lateral line of contact at around a two degree angle to the longitudinal line of the belt. This is to avoid the chance that the type when it strikes the guide rails at rapid operation, will be caused to spin around, and thus get out of true position and either block the final channel and discharge device, or turn entirely around and present the wrong face foremost, which may also block the discharge device of my present embodiment.

By examining Fig. 11, it will be noted that as a type approaches a guide rail, the first thing that strikes the rail is the corner of the advancing foot of the type. This tends to twist the type by throwing the foot outwardly toward the center of the belt. By this time the head of the type will have come into contact with the rail and the type will then feed along the rail steadily and without being bounced around. It has been found that best operative speed can be obtained by this mode of orienting the type on the belt.

Also the slight taper to the lateral walls of the type heads results in a full contact of the heads with the guide rails without angular edges which might result in the belt twisting the type around. The taper is such that the lower edges of the feet of the type lie in the same plane as the tapered sides of the heads. Otherwise the feet are inside the plane. For the short type illustrated the taper will be about 15 degrees.

In the particular embodiment shown, a cylindrical chase 70, mounted on a shaft 71, and advanced step by step, by means of a pawl 72, slidable in a bracket 73 on the side of the type discharge mechanism frame near the typewriter. The pawl is actuated by a lever 74 (Fig. 21), which is connected to a spindle 75. This spindle has located at its inner end (Fig. 13) an arm 76, which lies beneath one end of a rod 77.

The rod 77 is bent at its inner end and is rotatably mounted at 78 on the nearest guide rail member, in such a way that its inner end when rocked downwardly will lie in the channel between the two guides and stop the movement of type therethrough. When the chase is indexed to a new position the effect is to rock the inner end of the rod 77 upwardly to release type, after an initial depression of the rod, by means of the mechanism now to be described.

A dash pot 79 is mounted on the machine frame having a piston 80 therein. A hand lever 81 is connected to the outer end of the piston by means of a link 82, the arrangement being such that when the lever is pressed to the right (Fig. 21) the piston will be moved outwardly and to the right, and thereupon the spring 83 within the dash pot will slowly press the piston back to its original position, opposed by the compression of air within the dash pot.

The bent rod 77 will normally lie by gravity with its inner end in the type channel formed by the guide bars, but is held in position rocked upwardly, by means of a latch plate 84, which is mounted on a slotted plate 85, through the slot of which the end of the rod 77 extends. This plate will not swing past the position shown in Fig. 21, to the left, but can be swung to the right.

When the piston 80 is pushed to the right (Fig. 21) the pawl 86 on the end of the piston rides under the pin 87 on the latch plate 84. But when the pawl returns with the piston it will act so as to rock the latch plate to the left, and thus release the rod 77 permitting it to drop.

As so constructed, the mechanism, is used as follows:

When the operator sees that he is nearing the end of a line, and knows that the chase will have to be indexed to a new line, he will thrust over the hand lever 81. He will then continue to eject type by means of the typewriter, with the assurance that the type which he ejects will not get into the chase. This is because the timing of the dash pot is such that it will not move on its return stroke until the belt has cleared itself of type deposited thereon, to the extent that the type has all passed the point where the rod 77 would stop it.

However, any type ejected after the lever 81 has been thrown over will be stopped by the rod 77, because the return stroke of the piston will cause the pawl to swing away the latch plate and permit the rod to rock down to type stopping position. The operator thereupon indexes the chase, which releases the type, so that the type will go into a new line, although the type discharge mechanism continues to work all of the time. In short, the effect is to hold back the type not wanted in the chase, but to permit the belt to clear itself of type which is wanted in the chase.

The advantage lies in the fact that the operator does not have to stop operating the typewriter mechanism at the period when it is necessary to index the chase, in order to let the belt clear itself.

As in my former application, the type discharging mechanism is preceded by a series of type spacing fingers, arranged to deliver type in a definite spacing, one at a time to the discharge wheel. The fingers 88, are mounted to reciprocate in a case 89, and engage the type as they pass over the delivery wheel 55. The discharge wheel is covered by two plates 56 and 57, which serve to continue the type channel formed by the guides as already described.

Figures 27, 29, 30:
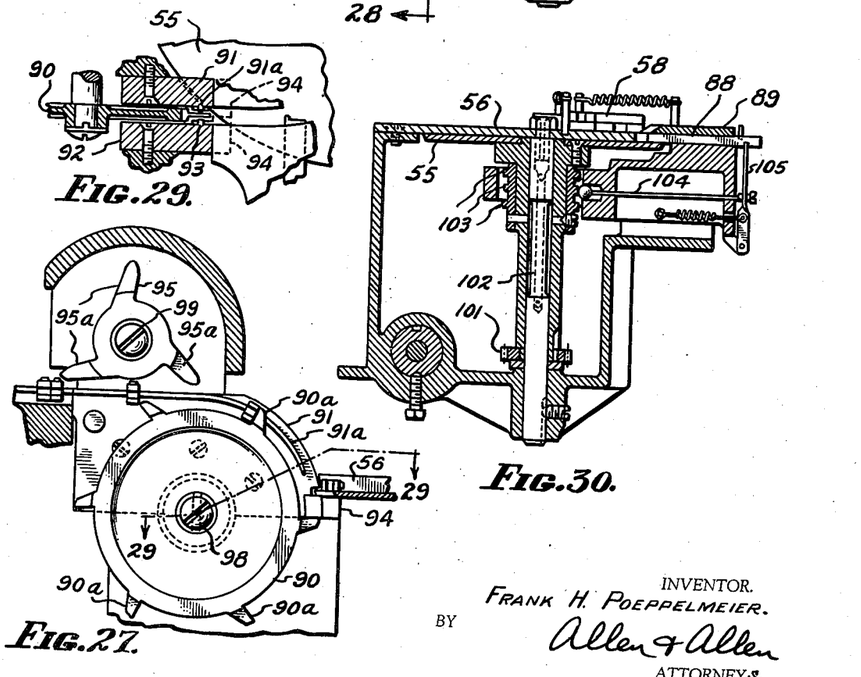
Fig. 27 is a section taken along line 27—27 of Fig. 26.
Fig. 29 is a section along line 29—29 of Fig. 27.
Fig. 30 is a section along line 30—30 of Fig. 13.
Figure 28:
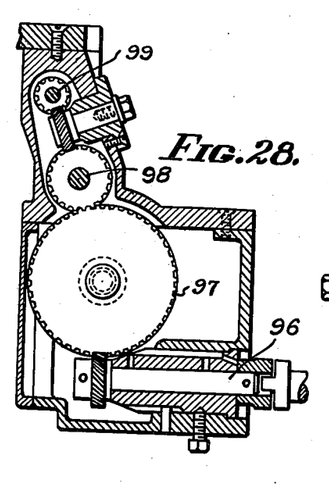
Fig. 28 is a section taken along line 28—28 of Fig. 26.

The discharge wheel 90 is formed with teeth 90a which engage the pieces of type as they are delivered from the fingers, and this wheel operates between a backing plate 91, which has a rib 91a thereon to engage the channel at one side of each piece of type, whereas the hinged cover plate 92 has a companion rib 93. These ribs go in beyond the point where the piece of type is picked up by the teeth on the discharge wheel from the companion lugs 94 (Fig. 27), on the backing plate and cover plate, which lie under the outlet of the channel between the plates 56 and 57, where the discharge wheel leaves the type, ready to be picked off.

The operation of the discharge wheel is made more certain and the type delivered with considerable force to the chase channels by means of a timed toothed wheel 95, (Fig. 27), which lies above the discharge wheel and has teeth 95a which engage each piece of type in order to eject it forcibly into the chase channel. This additional wheel (not found in my original application) serves to make the type discharge more positive. The ribs 91a and 93 extend horizontally from the point where the type leave the influence of the discharge wheel and come under the influence of the added ejector.

The drive for the various elements of the type discharge is shown in Figs. 26, 27, 28, 29 and 30. A drive shaft 96, drives the gear train marked generally 97, which actuates the shaft 98 for the discharge wheel, and also the shaft 99 for the ejector wheel. A gear 100 is also driven from the same train, which gear actuates a pinion 101 on a vertical shaft 102. This shaft carries the three cam rings 103, against which the ball shaped termini of the fingers 104 engage. The fingers are secured to the levers 105, which levers are spring held, and are connected to the ends of the fingers 88. As the shaft revolves with the cam rings 103, these serve to push away the fingers 88 in a timed relation, and their inner movement of the fingers is brought about by the springs, as shown on the drawings. This same shaft 102 revolves the delivery wheel, as shown.

The entire discharge mechanism operates in timed relation to deliver pieces of type singly to the chase, which itself will have ribs 106 (Fig. 21) which serve as continuations of the ribs 91a and 93.

It should be noted that the type discharge mechanism may be varied, without departure from the advantages of the type deposit and collocation by means of the belt and guides, and that the stop mechanism co-operating with the chase indexer is not dependent upon the exact form of type discharge but would be advantageous with other type discharge mechanism.

It will also be evident that while I have shown and described in detail a certain mechanism, that this can be varied in certain respects without departing from the inventive concepts illustrated in the said described embodiment, and I have left to the claims the expression of the novelty in the several co-operative parts.

Having thus described my invention, what I claim as new and desire to secure by Letters Patent is:

1. In a machine of the character described, a type magazine having means for containing type thereon, and means for mounting said type magazines in a predetermined position over a type receiving belt, comprising location defining pin and hole members on the machine and the magazine for each lower end of the latter, supporting posts on said machine, and means on the magazines to engage said supporting posts, said means being such that the magazines are relatively movable with relation to said posts, thereby permitting the location definition first above mentioned.

2. In a machine of the character described, a type magazine having means for containing type thereon, and means for mounting said type magazines in a predetermined position over a type receiving belt, comprising location defining pin and hole members on the machine and the magazine for each lower end of the latter, supporting posts on said machine, and means on the magazines to engage said supporting posts, said means being such that the magazines are relatively movable with relation to said posts, thereby permitting the location definition first above mentioned, and another type magazine similarly mounted to the first, the location defining pin and hole members being such as to retain the magazines at an angle to each other.

3. In a machine of the character described, having a type receiving belt and a type magazine from which type is ejected onto the belt, means for orienting each type with relation to the belt comprising a comb, the teeth of which define channels through which the type must move, said comb lying over the belt.

4. In a machine of the character described, having a type receiving belt and a type magazine from which type is ejected onto the belt, means for orienting each type with relation to the belt comprising a comb, the teeth of which define channels through which the type must move, said comb lying over the belt, said magazines having channels for type, and the comb teeth arranged to abut against the channel walls when placed into operative position.

5. In a machine of the character described, having a type receiving belt and a type magazine from which type is ejected onto the belt, means for orienting each type with relation to the belt comprising a comb, the teeth of which define channels through which the type must move, said comb lying over the belt, said comb arranged with its teeth out of parallel with the line of movement of the belt.

6. In a machine of the character described, having a type receiving belt and a type magazine from which type is ejected onto the belt, means for orienting each type with relation to the belt comprising a comb, the teeth of which define channels through which the type must move, said comb lying over the belt, and means for mounting said comb, said means comprising means for shifting the comb to and from the magazine.

7. In a machine of the character described, having a type receiving belt and a type magazine from which type is ejected onto the belt, means for orienting each type with relation to the belt comprising a comb, the teeth of which define channels through which the type must move, said comb lying over the belt, and means for mounting said comb, said means comprising means for shifting the comb to and from the magazine, without changing the position of the comb with relation to the plane of the belt.

8. In a machine of the character described, having a type receiving belt and a type magazine from which type is ejected onto the belt, means for orienting each type with relation to the belt comprising a comb, the teeth of which define channels through which the type must move, said comb lying over the belt, and means for mounting said comb, said means comprising means for shifting the comb to and from the magazine at the extremities of the teeth away from the magazine, at least, whereby the type are forced to follow one wall of the teeth at this point.

9. In a machine of the character described, having a type receiving belt and a type magazine from which type is ejected onto the belt, means for orienting each type with relation to the belt comprising a comb, the teeth of which define channels through which the type must move, said comb lying over the belt, and means for mounting said comb, said means comprising means for shifting the comb to and from the magazine at the extremities of the teeth away from the magazine, at least, whereby the type are forced to follow one wall of the teeth at this point, said out of parallel arrangement so directed that the engagement of the type delivered foot foremost between the teeth, will engage by its head the tooth wall into which it is delivered at its side toward the side of the belt.

10. In a type setting machine the combination with means for depositing type from a magazine onto a belt, a belt, a guide on said belt to bring the deposited type into line, and means for orienting the type so that the portion delivered foremost strikes the guide before the remainder.

11. In a type setting machine the combination with means for depositing type from a magazine onto a belt, a belt, a guide on said belt to bring the deposited type into line, and means for orienting the type so that the portion delivered foremost strikes the guide before the remainder, said means comprising a comb between the teeth of which the type must pass when it is deposited on the belt.

12. In a type setting machine the combination with means for depositing type from a magazine at various positions across a moving belt, converging guides located over said belt and forcing the type into line, and means for orienting the type which will contact the guides on either side of the center line of the belt, so that the portion thereof which is foremost will strike the guide lying in its path with the belt.

13. In a type setting machine the combination with means for depositing type from a magazine at various positions across a moving belt, converging guides located over said belt and forcing the type into line, and means for orienting the type which will contact the guides on either side of the center line of the belt, so that the position thereof which is foremost will strike the guide lying in its path with the belt, said means comprising a comb, the teeth of which provide channels through which the type must pass, said teeth arranged so that the ends thereof, at least, are out of line with the belt, so as to result in applying a drag to the portion of the type which is rearmost, thus swinging the type to bring its foot out of parallel with the belt movement in the direction of the guide which it will contact.

14. In combination with type magazines and means for discharging type therefrom, a moving belt, and guides located above the belt, the type magazines being arranged at an angle to each other of substantially 94 degrees, and the guides arranged to converge toward each other at an angle of substantially 50 degrees.

15. In combination with a type magazine, and means for discharging type therefrom, a moving belt on which the type is deposited, and converging guides for bringing the deposited type into line, said guides terminating in a channel of the width to receive type only one at a time, diverted at an angle to the belt, and extending to a point of type discharge, and means for lifting at least one of the guides to permit type to pass along with the belt instead of moving through said terminal channel.

16. In combination with a type magazine, and means for discharging type therefrom, a moving belt on which the type is deposited, and converging guides for bringing the deposited type into line, said guides terminating in a channel of the width to receive type only one at a time, diverted at an angle to the belt, and extending to a point of type discharge, and means for lifting at least one of the guides to permit type to pass along with the belt instead of moving through said terminal channel, said means being confined to that one of the guides which is on the far side of the channel.

17. In combination with a type magazine, and means for discharging type therefrom, a moving belt on which the type is deposited, and converging guides for bringing the deposited type into line, said guides terminating in a channel of the width to receive type only one at a time, diverted at an angle to the belt, and extending to a point of type discharge, and means for lifting at least one of the guides to permit type to pass along with the belt instead of moving through said terminal channel, and comprising a cable, a pulley mounted over a portion of said guide and connected to the cable, and manual means for operating the cable.

18. In combination with a type magazine, a moving belt, and means for discharging type onto the belt, converging guides over the belt arranged to bring the type into line, said guides terminating in a channel for type to move singly, and a member serving as a guide and located at the convergence of the guides, to provide type width channels at each side of the point of convergence.

19. In combination with a moving belt, type magazines mounted over said belt, means for discharging type from said magazines on the belt, said magazines being arranged to form an angle with respect to each other from the center line of the belt, guides for bringing the type into line converging toward each other, at a point away from the magazines, said guides being fixed, and the relative angle of the magazines and the guides being such that a type in frictional contact with a guide for the longest distance, will reach the point of convergence of the guides in substantially the same length of time as a type which does not contact with any guide, until it reaches the point of convergence.

20. In combination in a machine of the character described, a type magazine, having columns of type therein, ejector devices for removing the lowermost type selectively from any column, said ejector devices including plungers, and the type being mounted with its printing face toward the ejectors, said plungers having their ends shaped to fit the particular type, so as to avoid cocking the type in the act of ejecting it.

21. A type magazine plate for use in machines of the character described, comprising a backing plate, a series of sheet metal partition members formed with folds therein, to act as ribs for engaging the grooves in the sides of type mounted therebetween.

22. A type magazine plate for use in machines of the character described, comprising a backing plate, a series of sheet metal partition members formed with folds therein, to act as ribs for engaging the grooves in the sides of type mounted therebetween, a type shelf extending across beneath all the resulting type holders, said shelf being notched so as to permit introduction of type guiding devices, forming an orienting device for type carried on a belt moving beneath said shelf.

23. In a type setting machine the combination with a moving belt, means for depositing type thereon, and guide means for bringing said type into line, a type receiving device, a type discharge device for transferring said type from the belt to the receiving device, and stop means located in the guide means, for blocking the movement of type therein, and a delayed action member for operating said stop means.

24. In a type setting machine the combination with a moving belt, means for depositing type thereon, and guide means for bringing said type into line, a type receiving device, a type discharge device for transferring said type from the belt to the receiving device, and stop means located in the guide means, for blocking the movement of type therein, and a delayed action member for operating said stop means, said type receiving device having an indexing means, and means operated thereby which lifts the said stop.

25. In a type delivery mechanism, the combination with means for delivering type in a sidewise position, a toothed rotary member to engage said type, ribs following partially the periphery of the rotary member for engaging lateral grooves in the type during their movement with the rotary member, said ribs extending then substantially tangentially of the periphery of the said rotary member, and a second rotary member located above the first and having teeth to engage the type upon said tangential rib extensions, and force it into a groove type holder.

26. In combination with a moving belt and means for delivering type onto said belt in selected order at various points across the belt, guides converging to bring the type into line and located over said belt, said guides being fixed and their edges tapered away from the portion closest to the belt, whereby the type will have a small area of engagement with the guides.

27. In combination with a moving belt and means for delivering type onto said belt in selected order at various points across the belt, guides converging to bring the type into line and located over said belt, said type being arranged to be ejected foot foremost and having heads wider than the feet, said heads being tapered to a small angle to lie against the guides at their heads, with a fuller engagement than at their feet, whereby the feet are kept against the guides.

FRANK H. POEPPELMEIER.